United States Patent
Bartel et al.

(10) Patent No.: US 6,270,710 B1
(45) Date of Patent: Aug. 7, 2001

(54) PROCESS FOR MANUFACTURING HOLLOW PLASTIC OBJECTS

(75) Inventors: Walther Bartel, Stuttgart; Wolfgang Cedzich, Remseck; Robert Vaculik, Marbach; Richard Veigel, Tamm, all of (DE)

(73) Assignee: Filterwerk Mann & Hummel GmbH, Ludwigsburg (DE)

( * ) Notice: Subject to any disclaimer, the term of this patent is extended or adjusted under 35 U.S.C. 154(b) by 0 days.

(21) Appl. No.: 09/380,730
(22) PCT Filed: Feb. 14, 1998
(86) PCT No.: PCT/EP98/00843
  § 371 Date: Nov. 19, 1999
  § 102(e) Date: Nov. 19, 1999
(87) PCT Pub. No.: WO98/40195
  PCT Pub. Date: Sep. 17, 1998

(30) Foreign Application Priority Data

Mar. 13, 1997 (DE) .............................. 197 10 253

(51) Int. Cl.[7] .............. B29C 33/52; B29C 45/26
(52) U.S. Cl. ............... 264/219; 29/458; 29/460; 29/527.5; 164/27; 264/317; 264/338
(58) Field of Search ................... 264/317, 338, 264/219, 221; 249/62; 29/527.5, 460, 458, 527.3; 164/27

(56) References Cited

U.S. PATENT DOCUMENTS

| | | | | |
|---|---|---|---|---|
| 2,345,977 | * | 4/1944 | Howald et al. | 249/62 |
| 2,759,231 | * | 8/1956 | Parlanti | 249/62 |
| 3,193,883 | * | 7/1965 | Thibodaux, Jr. et al. | 249/62 |
| 4,343,757 | * | 8/1982 | Popplewell | 264/317 |
| 4,464,324 | * | 8/1984 | Hager | 264/317 |
| 5,415,373 | * | 5/1995 | Brummer | 264/317 |
| 5,435,960 | * | 7/1995 | Bressler et al. | 249/62 |
| 5,614,143 | * | 3/1997 | Hager | 264/317 |

FOREIGN PATENT DOCUMENTS

| | | | | |
|---|---|---|---|---|
| 50-11935 | * | 5/1975 | (JP) | 264/317 |
| 58-20430 | * | 2/1983 | (JP) | 264/317 |

\* cited by examiner

*Primary Examiner*—Allan R. Kuhns
(74) *Attorney, Agent, or Firm*—Crowell & Moring, L.L.P.

(57) ABSTRACT

A process for manufacturing hollow synthetic resin bodies or objects in which cores are produced in casting molds, then placed into molds of injection molding machines, and subsequently enveloped with injected synthetic resin material (35) which then solidifies. The molds are then heated up to a temperature at which the cores melt and at which the molten cores can be removed from the molds. The cores are made of shell halves (32, 33) which are assembled before the synthetic resin material (35) is injection molded around them.

6 Claims, 2 Drawing Sheets

PROCESS FOR MANUFACTURING HOLLOW PLASTIC OBJECTS

BACKGROUND OF THE INVENTION

The invention relates to a process for manufacturing objects of synthetic resin.

In FR-PS 1 366 921 a process is disclosed for the manufacture of thermoplastic parts made by injection molding with at least one opening to a hollow cavity. For this purpose the molten thermoplastic material is injected into a mold which consists of strong material of good thermal conduction, and in which at least one core is provided which consists of a hard material and is resistant to collapse and deformation during injection molding, but begins to melt at a temperature that is between the deformation temperature and the resoftening temperature of the thermoplastic material. After injection molding the shaped object with the core is heated to a temperature between the deformation temperature and the softening temperature of the shaped object so that the core will melt out without melting the thermoplastic material, in order thus to remove the core from the casting. An alloy of bismuth and tin is named as the material for the remeltable cores. After melting out, the metal is usable again and is supplied again to the casting process.

Furthermore, DE-OS 26 28 390 discloses a method and an apparatus for producing one or more hollow sand cores for casting molds. These so-called shell cores are made by mixing thermosetting binding agent with sand. This sand is shaken in a heated core box and after the core surface has hardened the entire core box is rotated 180° and the excess sand that has not hardened is poured out. In this manner hollow cores are obtained which are more economical than solid cores due to the lesser amount of material and their quick preparation.

A disadvantage of the known state of the art is that, for one thing, a solid core requires the use of a large amount of material, but on the other hand the use of hollow cores, especially when metal is used as the core material, is complicated and at the same time there is no assurance that a uniform wall thickness will be maintained.

SUMMARY OF THE INVENTION

The invention is addressed to the problem of avoiding the aforementioned disadvantages and providing a process for manufacturing objects of synthetic resin which while using a small amount of material, will permit great accuracy of the cores and hence of the component being made.

This problem is solved by the invention as described and claimed hereinafter.

A process for manufacturing a hollow synthetic resin product is known from DE 41 21 441 in which half-shells or halves of a core are made of water-soluble resin. These halves, however, must additionally be sprayed with a water-resistant resin. After the hollow plastic product is made the non-water resistant resin is washed out, while the water-resistant resin remains in the synthetic resin product.

In contrast thereto, the advantage of the invention is that the partial shells of metal permit a seamless joining together and additional elements or additional spraying or wrapping are not necessary.

According to one embodiment of the invention the partial shells are pressed or squeezed together. It is also possible to affix the partial shells together via an undercut in the manner of a snap fastening. Of course, the metal of the partial shells can also be welded or cemented to each other.

If desired, the partial shells can be sprayed or coated with a lacquer or a hardenable liquid after assembly. The purpose of this layer is to improve the strength or the surface of the synthetic resin object after the core has been melted out of the synthetic resin object.

If the half shells or partial shells have a very large hollow interior cavity, it is possible to provide support by means of an internal structure. This structure is composed, of course, of the material of the cores and is removed from the hollow synthetic resin object when the cores are melted.

These and additional features of preferred embodiments of the invention will be found not only in the claims but also in the description and the drawings, and the individual features can each be realized individually or together in the form of subcombinations in embodiments of the invention and in other fields, and may constitute advantageous as well as independently patentable embodiments, for which protection is hereby claimed.

BRIEF DESCRIPTION OF THE DRAWINGS

The invention is described below with reference to a working embodiment shown in the accompanying drawings.

DETAILED DESCRIPTION OF PREFERRED EMBODIMENTS

Figure 1:
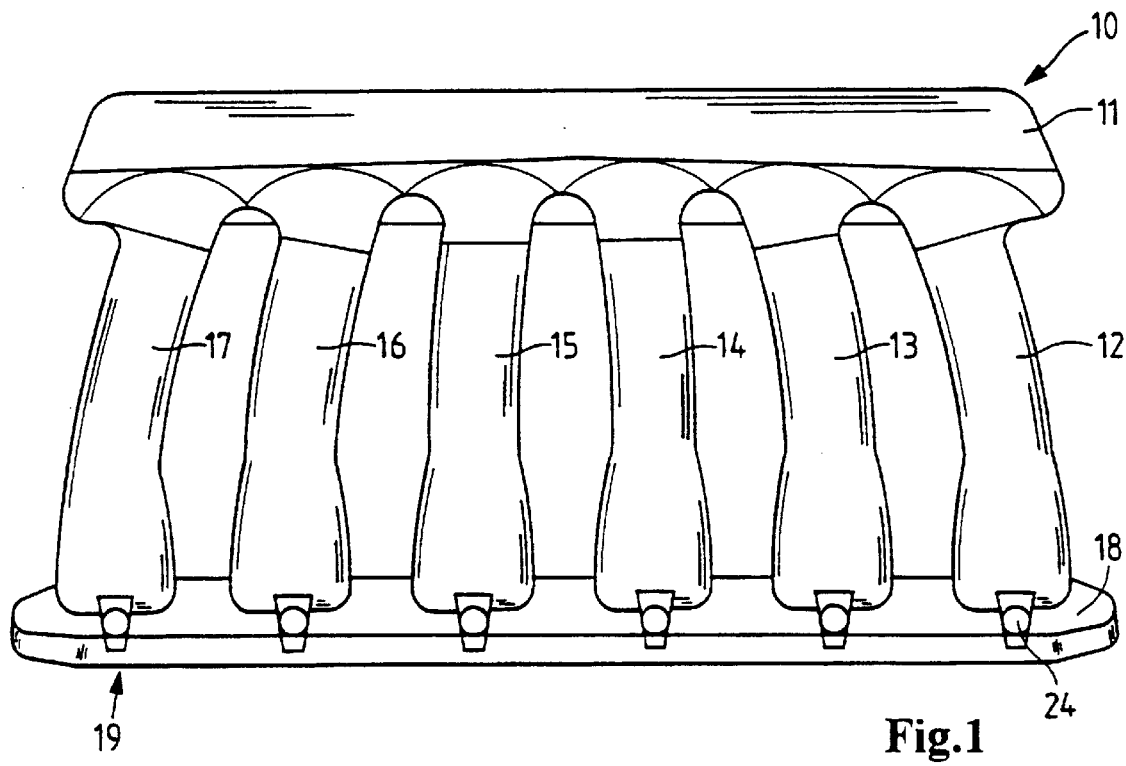
FIG. 1 shows a motor intake tube which was manufactured by the core melting technique.

A motor intake tube or suction tube 10 for an internal combustion engine is produced from a thermoplastic synthetic resin. The intake tube 10 is comprised of an air collecting chamber 11 to which clean air filtered by a filter element, not shown here, is delivered. From this air collecting chamber 11 individual intake tubes 12, 13, 14, 15, 16, 17 extend to a connecting flange 18 joining the individual intake tubes together. In the connecting flange there are openings 19, 20, 21, 22, 23, 24 for injection nozzles, as well as mounting holes.

The process steps in the manufacture of such an intake tube are the manufacture of the core in a low-pressure process from a tin-bismuth alloy. This core is taken from the casting mold and placed in an injection molding machine. After thermoplastic synthetic resin material has been injected all around the core, the core is melted out and the synthetic resin object is washed out. A core of this type for the manufacture of an intake manifold comprising six individual intake tubes weighs between 40 and 50 kilograms; this of course makes handling it considerably more difficult.

Figure 2:
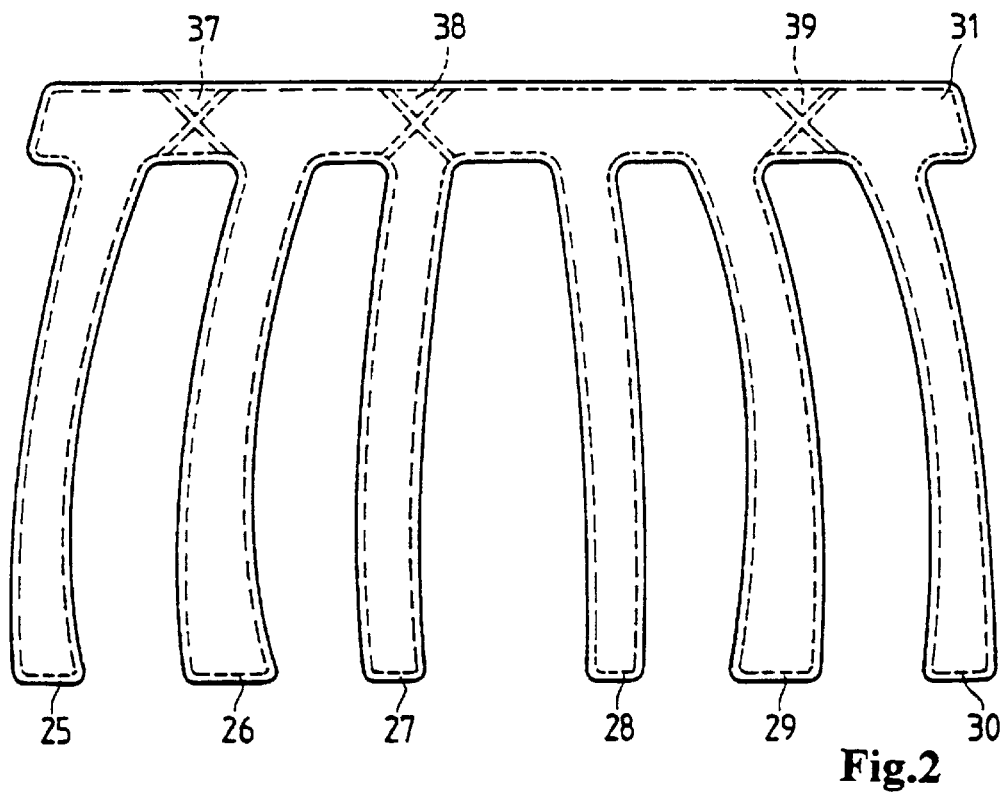
FIG. 2 shows a core put together from a plurality of half shells.

FIG. 2 shows a core for the intake manifold shown in FIG. 1. It is comprised of six tubes 25, 26, 27, 28, 29, 30 which are constructed by the half-shell technique, as well as a collecting tube 3 1. The tubes 25 to 30 are joined to the manifold tube 31 by plug-in connections.

Figure 3:
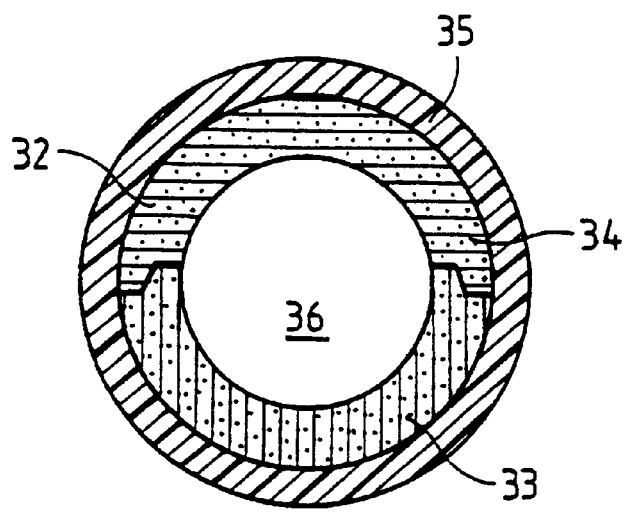
FIG. 3 shows a cross section through a half-shell core.
Figure 4:
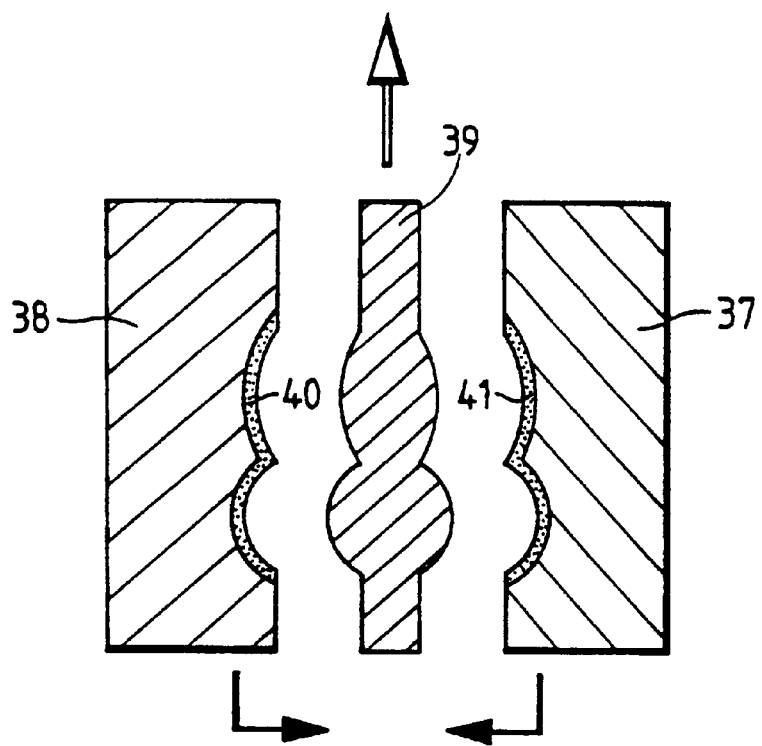
FIG. 4 shows a tool for producing the half shells.

The construction of the tubes is shown in FIG. 3. They consist of an upper half shell 32 and a lower half shell 33, which are interlocked or snap-fastened to each other, for example, in connecting region 34. The tubes are, as already mentioned, sprayed all around with a thermoplastic synthetic resin material 35. This forms the intake tube or the individual tubes according to FIG. 1. The half shells can be made according to their geometry in a core casting machine, since the machines can be opened on two sides and a stage tool can be used without additional difficulty.

In particular it is possible to carry out the pressing of the half shells in the core casting mold. For this purpose the center plate 39 of the mold is removed and the two outer mold halves 37 and 38 are closed, so that the half shells 40 and 41 can be assembled to one another. Thus there is no need for an additional seam apparatus.

An important advantage in the use of tubes as cores also is that, when the core is melted out the melting liquid can get into the core and thus results in a more rapid heat transfer and a faster melt-out.

What is claimed is:

1. A process for the manufacture of synthetic resin objects comprising the steps of producing at least one hollow core by casting a plurality of metal half shells in a casting mold comprising a pair of opposed mold halves which close on opposite sides of a center plate, and after casting said cast metal half shells, the center plate is withdrawn from between the mold halves and said cast metal half shells are assembled and joined together by reclosing the mold halves such that said cast metal half shells are pressed in contact with each other to form said at least one core such that said cast metal half shells enclose a hollow interior cavity, placing the produced at least one hollow core in a mold of an injection molding machine, injecting synthetic resin material around said at least one core in said mold of the injection molding machine so that the at least one core is enclosed in the synthetic resin material, said synthetic resin material having a melting temperature which is higher than the melting point of the core, and thereafter heating said at least one core enclosed in synthetic resin material to a temperature at which said at least one core melts, and removing the molten material from the mold of the injection molding machine.

2. A process according to claim , wherein the half shells are pressed or squeezed together.

3. A process according to claim 1, wherein the half shells are assembled by affixing them to each other via an undercut by a snap fastening.

4. A process according to claim 1, wherein the half shells are welded or cemented to one another.

5. A process according to claim 1, further comprising the step of spraying or coating the assembled half shells with a lacquer or a hardenable liquid prior to placing the at least one hollow core in the mold of the injection molding machine.

6. A process according to claim 1, wherein the hollow core further comprises an internal structure for supporting the assembled half shells.

* * * * *